United States Patent
Onozawa et al.

[11] Patent Number: 6,108,045
[45] Date of Patent: *Aug. 22, 2000

[54] DISPLAY APPARATUS WITH CATHODE RAY TUBE

[75] Inventors: Makoto Onozawa; Hironori Fukuda; Yuzo Nishinaka, all of Yokohama; Junji Motoshima, Fujisawa, all of Japan

[73] Assignees: Hitachi, Ltd., Tokyo; Hitachi Video & Information System, Inc., Yokohama, both of Japan

[*] Notice: This patent is subject to a terminal disclaimer.

[21] Appl. No.: 09/359,432

[22] Filed: Jul. 22, 1999

Related U.S. Application Data

[63] Continuation of application No. 08/908,793, Aug. 8, 1997, Pat. No. 6,011,593.

[30] Foreign Application Priority Data

Aug. 8, 1996 [JP] Japan ................................. 8-209560

[51] Int. Cl.$^7$ ............................................ H04N 5/46
[52] U.S. Cl. ........................ 348/556; 348/704; 348/687
[58] Field of Search .................................. 348/687, 704, 348/556, 555, 189, 190, 602, 656, 657; 315/441, 370, 371

[56] References Cited

U.S. PATENT DOCUMENTS

| | | | |
|---|---|---|---|
| 4,521,802 | 6/1985 | Ikeda | 358/11 |
| 4,982,279 | 1/1991 | Ishii et al. | 358/160 |
| 5,193,006 | 3/1993 | Yamazaki | 348/556 |
| 5,291,295 | 3/1994 | Srivastava | 348/687 |
| 5,357,175 | 10/1994 | Kamada et al. | 315/441 |
| 5,523,657 | 6/1996 | Kamei | 315/368.18 |
| 5,699,127 | 12/1997 | Ando et al. | 348/687 |

FOREIGN PATENT DOCUMENTS

3-20572  2/1991  Japan .

*Primary Examiner*—Victor R. Kostak
*Attorney, Agent, or Firm*—Evenson, McKeown, Edwards & Lenahan, P.L.L.C.

[57] ABSTRACT

A display apparatus includes a luminance change detecting unit for detecting change of luminance of a cathode ray tube, a deflection size control quantity adjusting unit connected to the luminance change detecting unit for stabilizing a deflection size by changing a deflection size correcting quantity at different rates of change for a low luminance range and a high luminance range, respectively, on the basis of the detected change of luminance. The deflection size control quantity adjusting unit generates a proper deflection size control quantity adjusting voltage by synthesizing a high frequency component and a low frequency component contained in a signal indicating the luminance change with different gains, respectively.

10 Claims, 7 Drawing Sheets

PRESENT INVENTION

FIG.7
PRIOR ART

DISPLAY APPARATUS WITH CATHODE RAY TUBE

This application is a continuation of application Ser. No. 08/908,793, filed Aug. 8, 1997 now U.S. Pat. No. 6,011,593.

BACKGROUND OF THE INVENTION

The present invention generally relates to a display apparatus. More specifically, the invention is concerned with a display apparatus for a television receiver set, a computer terminal or the like in which a cathode ray tube is employed.

In the conventional television receiver sets, scanning operation is performed with such magnitude or size of deflection (hereinafter referred to as the deflection size) that a screen of a cathode ray tube in which images, pictures, etc. are displayed is generated in a greater size than that of the faceplate of the cathode ray tube (known as the over-scan operation). Consequently, variation in the screen size brought about by variation in luminance (which may also be referred to as brightness) is relatively inconspicuous. In recent years, as the personal computer becomes more popular, there arises a demand for the capability of displaying pictures, images and so forth generated by a personal computer on a television receiver set.

In order to display the image information generated by the personal computer without any shortage, it is required to perform the scanning operation with such deflection size that the screen size or display area is smaller than that of the faceplate of the cathode ray tube (known as the under-scan operation). In that case, edges of the display area appear on the faceplate. Consequently, variation of the deflection size taking place in accompanying change of luminance or brightness becomes noticeable, giving rise to a problem.

On the other hand, in the conventional display apparatus for the personal computer, the under-scan operation is adopted. However, because the brightness or luminance of the screen is not so high as in the case of the television receiver set, variation of the screen size or display area can be neglected. Recently, however, in an effort to ensure enhanced picture quality for the display of motion pictures, there is a tendency of increasing the brightness or luminance by increasing the beam current of the cathode ray tube. As a result, the display apparatus for the computer terminal also suffers the problem that relatively conspicuous variation of the deflection size (in other words, noticeable variation of the screen size or display area) accompanies a change of luminance.

Under the circumstances, there has already been developed a technique for suppressing variation of the deflection size brought about as luminance changes, as is disclosed in Japanese Utility Model Application Publication No. 20572/1991 (JP-UA-3-20572). According to this conventional technique, variation of the beam current occurring with the change in luminance is detected, wherein the horizontal deflection size is so controlled on the basis of the detected beam current that the deflection size can remain substantially invariable. With this conventional method, variation of the horizontal deflection size brought about by the change of luminance can certainly be suppressed at least partially. However, it is impossible to exclude completely variation of the horizontal deflection size, due possibly to the fact that the change of the beam current of the cathode ray tube can not always provide a good basis for the availability of an optimal horizontal deflection size correcting quantity. In general, when an anode voltage of the cathode ray tube changes, the screen size or display area on the faceplate (i.e., deflection size) changes substantially in inverse proportion to a square root of the anode voltage. Further, when output impedance of a flyback transformer which supplies the anode voltage for the cathode ray tube is regarded as being constant, the anode voltage changes substantially in accordance with a linear function as the beam current changes. On the other hand, the amplitude of the horizontal deflecting current exhibits an essentially linear relationship with the horizontal deflection size. Accordingly, variation of the horizontal deflection size can not satisfactorily be eliminated even when the horizontal deflecting current is changed as a linear function of the change of the beam current.

Figure 7:
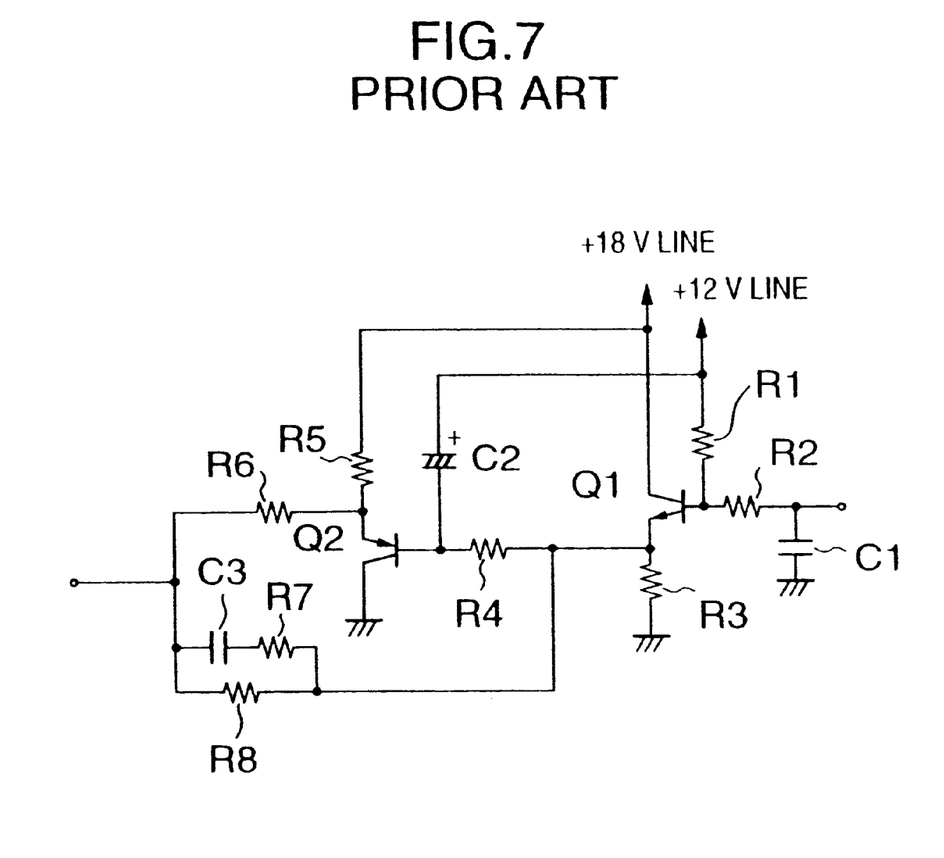
FIG. 7 is a circuit diagram showing a conventional display correcting apparatus known heretofore.

FIG. 7 shows a circuit disclosed in the Japanese publication mentioned previously (see FIG. 4 of the same). Referring to FIG. 7, such circuit arrangement is adopted that a horizontal size correcting signal is generated substantially as a linear function of the change in the beam current, wherein a horizontal deflecting current is changed on the basis of the horizontal size correcting signal. Accordingly, with the prior art technique disclosed in the above-cited publication, variation of the horizontal deflection size which accompanies the change of luminance can be suppressed to a certain extent. However, it is impossible to avoid completely the variation of the horizontal deflection size.

SUMMARY OF THE INVENTION

In the light of the state of the art described above, it is a first object of the present invention to provide a display apparatus in which variation in the size of a display area (i.e., deflection size) taking place in accompanying a change of luminance can be suppressed to a significant extent when compared with the prior art described above.

Again referring to FIG. 7, in the display correcting circuit disclosed in Japanese Utility Model Application Publication No. 20572/1991 cited hereinbefore, a method for correcting a meandering distortion which may occur upon displaying a window in white (refer to FIG. 6A) is taught as well. More specifically, an AC component contained in a changing beam current is detected by a circuit constituted by resistors R7 and R8 and a capacitor C3 connected in such manner as shown in FIG. 7, whereon the AC component as detected is superposed on the horizontal size correcting signal. Of the circuit elements mentioned above, the resistor R7 serves for adjusting the amplitude of the AC component signal indicating the change of the beam current, while the serial connection of the resistor R8 and the capacitor C3 serves for adjusting amplitude of a high-frequency component signal having a higher frequency than that of the signal indicating the change of the beam current. However, with the prior art technique mentioned above, concurrent display of a white window and vertical lines is still accompanied with meandering deformation of the vertical lines (see FIG. 6B), which deformation can not satisfactorily be suppressed. Even when the resistors R7 and R8 and the capacitor C3 shown in FIG. 7 are so adjusted that the meandering deformation of the white window becomes minimum, distortion of the vertical lines displayed immediately in succession to the white window (i.e., immediately beneath the white window on the screen) can not be avoided, the reason for which may be explained by the fact that a time constant involved in the change of the anode voltage assumes different values during a white window displaying period and immediately after the white window display, respectively. Consequently, even when the horizontal size correcting signal is generated such that the meandering distortion becomes minimum upon displaying of the white window, the waveform of the horizontal size correcting signal becomes deviated from the optimal correcting waveform immediately after the white window display.

In the light of the foregoing, it is a second object of the present invention to provide a display apparatus in which distortion of vertical lines displayed concurrently with a white window on a screen can be suppressed significantly when compared with the prior art.

In view of the first object mentioned above, there is provided according to an aspect of the present invention a display apparatus which includes a cathode ray tube, a luminance change detecting unit for detecting change of luminance of the cathode ray tube and a deflection size control quantity adjusting unit connected to the luminance change detecting unit for stabilizing a deflection size by changing the deflection size correcting quantity with different gains for a low luminance range and a high luminance range on the basis of the detected luminance change.

Further, for achieving the second object mentioned above, there is provided according to another aspect of the present invention, a display apparatus which includes a cathode ray tube, a luminance change detecting unit for detecting change of luminance of the cathode ray tube, and a deflection size control quantity adjusting unit for adjusting a correcting quantity for controlling a deflection size on the basis of the detected variation of luminance, wherein the deflection size control quantity adjusting unit is so arranged as to generate an optimal deflection size control quantity adjusting voltage by synthesizing a high frequency component and a low frequency component contained in a signal indicative of luminance change with different gains, respectively.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

Figure 1:
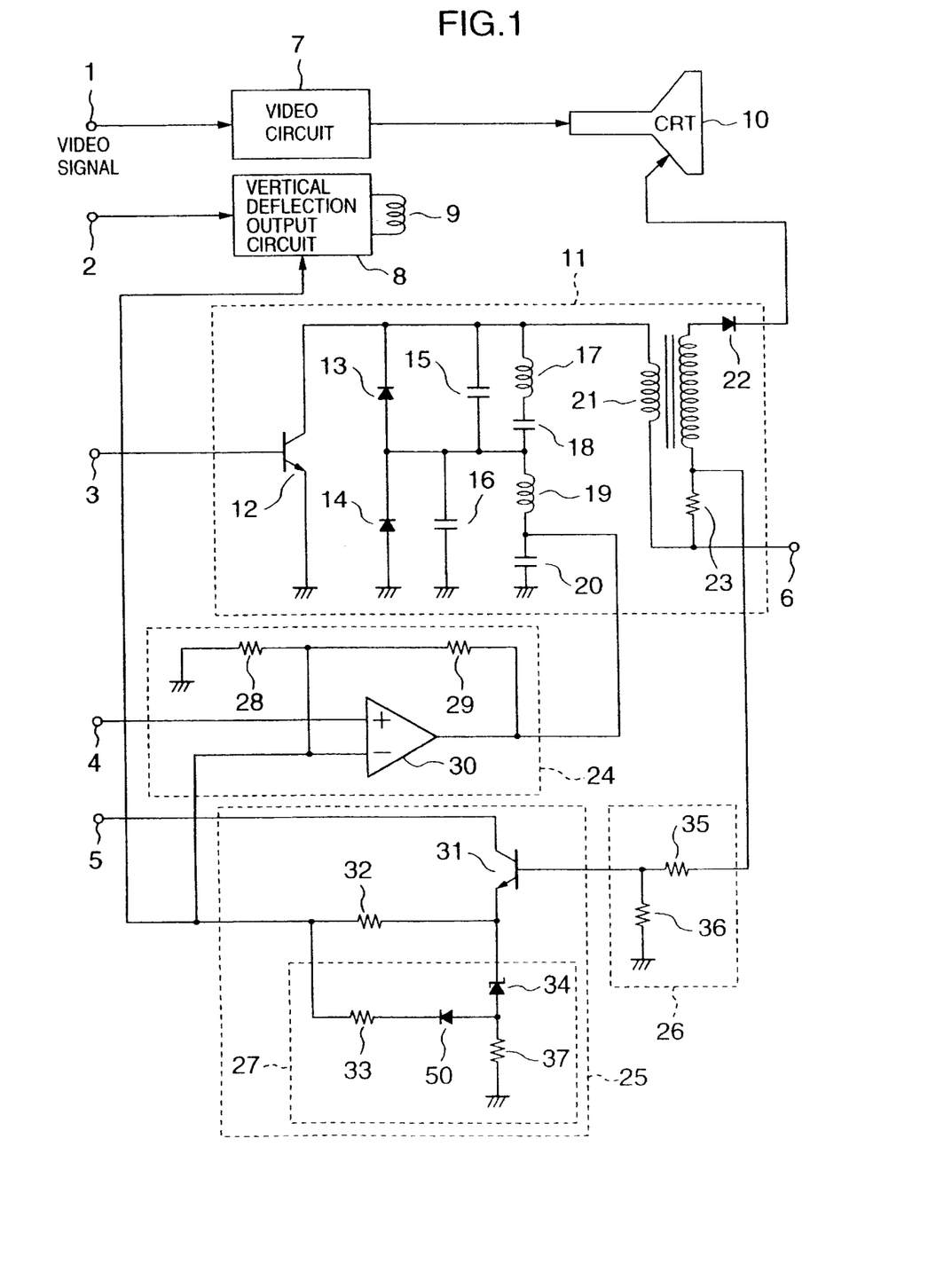
FIG. 1 is a circuit diagram showing a configuration of a display apparatus according to a first embodiment of the present invention.

FIG. 1 is a circuit diagram showing a configuration of a display apparatus according to a first embodiment of the present invention. In the figure, reference numeral 1 denotes a video signal input terminal, 2 denotes a vertical driving signal input terminal, 3 denotes horizontal driving signal input terminal, 4 denotes a horizontal size control signal input terminal, 5 and 6 denote source voltage input terminals, 7 denotes a video circuit, 8 denotes a vertical deflection output circuit, 9 denotes a vertical deflecting coil, 10 denotes a cathode ray tube (CRT), 11 denotes a horizontal deflection output circuit, 12 denotes a horizontal output transistor, 13 and 14 denote damper diodes, respectively, 15 and 16 denote resonant capacitors, respectively, 17 denotes a horizontal deflecting coil, 18 and 20 denote S-shaped correction capacitors, respectively, 19 denotes a modulation coil, 21 denotes a flyback transformer, 22 denotes a diode, 23, 28, 29, 32, 33, 35, 36 and 37 denote resistors, respectively, 24 denotes a horizontal size control circuit, 25 denotes a deflection size control quantity adjusting unit, 26 denotes a luminance change detecting unit, 27 denotes a deflection size control quantity change-over unit, 30 denotes a differential amplifier, 31 denotes a transistor, 34 denotes a Zener diode, and reference numeral 50 denotes a diode.

In the display apparatus shown in FIG. 1, the horizontal deflection output circuit 11 is comprised of the horizontal output transistor 12, the damper diodes 13 and 14, the resonant capacitors 15 and 16, the horizontal deflecting coil 17, the S-shaped correction capacitors 18 and 20, the modulation coil 19, the flyback transformer 21, the diode 22 and the resistor 23, while the horizontal size control circuit 24 is constituted by the differential amplifier 30 and the resistors 28 and 29. Further, the deflection size control quantity adjusting unit 25 is constituted by the transistor 31, the resistors 32, 33 and 37, the Zener diode 34, the diode 50 and the resistor 37. The deflection size control quantity change-over unit 27 is constituted by the resistor 33, the Zener diode 34 and the diode 50. Finally, the luminance change detecting unit 26 is implemented by using the resistors 35 and 36.

In the display apparatus shown in FIG. 1, the cathode ray tube 10 has a cathode electrode driven by the video circuit 7. An electron beam emitted from an electron gun incorporated in the cathode ray tube 10 is accelerated under the effect of an anode voltage supplied from the flyback transformer 21 to be thereby caused to impinge onto a phosphor layer deposited on the faceplate for generation of an image thereon. In that case, the electron beam is caused to scan the faceplate in both the vertical and horizontal directions under the influence of the magnetic fields generated by the vertical deflecting coil 9 and the horizontal deflecting coil 17, respectively.

In other words, the vertical deflection output circuit 8 drives the vertical deflecting coil 9 to thereby cause the electron beam to scan the faceplate in the vertical direction, while the horizontal deflection output circuit 11 drives the horizontal deflecting coil 17 so that the electron beam scans the faceplate in the horizontal direction.

Operation of the horizontal deflection output circuit 11 will be described below in more detail. The horizontal deflection output circuit 11 shown in FIG. 1 is generally referred to as the diode modulator circuit. In this diode modulator circuit, the horizontal deflecting current flowing through the horizontal deflecting coil 17 can be controlled by changing an inter-terminal voltage of the S-shaped correction capacitor 20 (i.e., a voltage appearing across the S-shaped correction capacitor 20). In the case of the circuit arrangement shown in FIG. 1, the horizontal size control circuit 24 is employed for controlling the inter-terminal voltage of the S-shaped correction capacitor 20.

In the horizontal size control circuit 24, the output voltage of the differential amplifier 30 is controlled in accordance with a horizontal size control signal inputted via the horizontal size control signal input terminal 4. In general, by supplying a parabolic waveform voltage changing at a vertical period to the horizontal size control circuit 24 via the horizontal size control signal input terminal 4, the horizontal deflecting current is modulated into a parabolic waveform current having the vertical period to thereby realize a side-pin correction. In that case, by changing a DC voltage component of the parabolic waveform voltage of the vertical period inputted via the horizontal size control signal input terminal 4, adjustment of the horizontal deflection size can be realized.

A feature of the present invention incarnated in the apparatus shown in FIG. 1 resides in that the output voltage of the deflection size control quantity adjusting unit 25 is superposed onto a feedback voltage inputted to the differential amplifier 30 incorporated in the horizontal size control circuit 24 mentioned above. Operation of the deflection size control quantity adjusting unit 25 will be elucidated below in more detail.

The deflection size control quantity adjusting unit 25 serves to control the deflection size control quantity adjusting voltage supplied to the horizontal size control circuit 24 by making use of a voltage which varies as the luminance signal inputted to the base of the transistor 31 changes. More specifically, when luminance is low, the base voltage of the transistor 31 is high. Consequently, the emitter voltage of the transistor 31 becomes high with the Zener diode 34 being turned on (i.e., in the conducting or on-state). Thus, the voltage which changes in accompanying the change in luminance is superposed on the deflection size control quantity adjusting voltage by way of the Zener diode 34, the diode 50 and the resistor 33 mentioned above.

On the other hand, when luminance is high, the base voltage of the transistor 31 is low with the emitter voltage of the transistor 31 being low as well. Consequently, the Zener diode 34 is in the off-state. Thus, the voltage changing in accompanying the change in luminance is not superposed on the deflection size control quantity adjusting voltage by way of the diode 50 and the resistor 33. In other words, the deflection size control quantity adjusting voltage is given only by the voltage supplied via the resistor 32.

Owing to operation described above, the deflection size control quantity adjusting voltage changes at a high rate in dependence on the change of luminance when luminance is low, while the deflection size control quantity adjusting voltage changes at a low rate in dependence on the change of luminance for a high luminance.

Parenthetically, the diode 50 incorporated in the deflection size control quantity change-over unit 27 functions to prevent a current from flowing through the resistors 33 and 37 when the Zener diode 34 is in the off-state (i.e., non-conducting state).

As the voltage which is inputted to the deflection size control quantity adjusting unit 25 and which changes as a function of change in luminance, the output voltage of the luminance change detecting unit 26 is utilized. In the display apparatus according to the instant embodiment of the invention shown in FIG. 1, change of the beam current is detected for generating the voltage corresponding to the luminance change. More specifically, a voltage making appearance across the resistor 23 connected to the flyback transformer 21 is divided by a resistor voltage division circuitry constituted by the resistors 35 and 36, whereby a voltage corresponding to the change of the luminance is derived.

According to the teaching of the invention in the first embodiment, change of the beam current is made use of as the information indicative of corresponding luminance change. It should however be mentioned that the voltage corresponding to the luminance change may be generated by detecting change in the anode voltage supplied to the cathode ray tube or by detecting the amplitude of the video signal, substantially to the same effect.

As is apparent from the above description, in the display apparatus according to the first embodiment of the invention, it is possible to change the deflection size correcting quantity at different rates of change for low and high luminance ranges, respectively, in dependence on the changes in luminance as detected. By virtue of this feature, variation of the horizontal deflection size can be suppressed more significantly when compared with the conventional technique.

Further, by supplying the deflection size control quantity adjusting voltage generated by the deflection size control quantity adjusting unit 25 to the vertical deflection output circuit 8 for controlling the vertical size on the basis of the deflection size control quantity adjusting voltage, size variation in the vertical direction can equally be reduced.

Figure 2A:
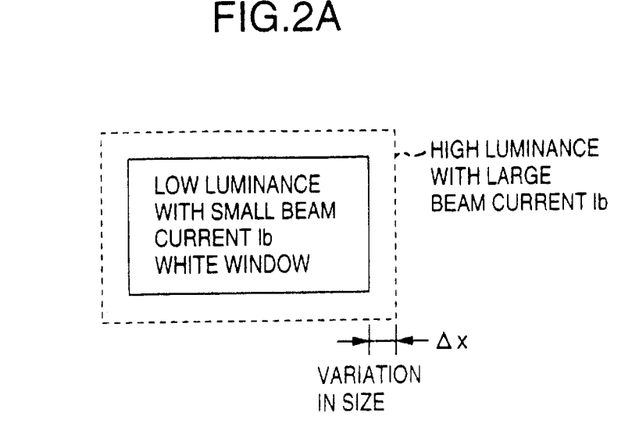
FIGS. 2A, 2B, 2C and 2D are views for illustrating operation of the display apparatus according to the first embodiment of the invention.

FIGS. 2A, 2B, 2C and 2D are views for illustrating the effects which can be achieved with the display apparatus according to the first embodiment of the invention. More specifically, FIG. 2A is a view illustrating variation in size when a white window (i.e., a window in white) of a relatively large area is displayed, wherein a solid-line frame represents a white window generated at a low luminance (i.e., with a small beam current Ib), while a broken-line frame represents a white window generated at a high luminance (i.e., with a large beam current Ib). In FIG. 2A, symbol ΔX represents a difference or variation in size in the horizontal direction between the windows generated at low and high luminance values, respectively.

Figure 2B:
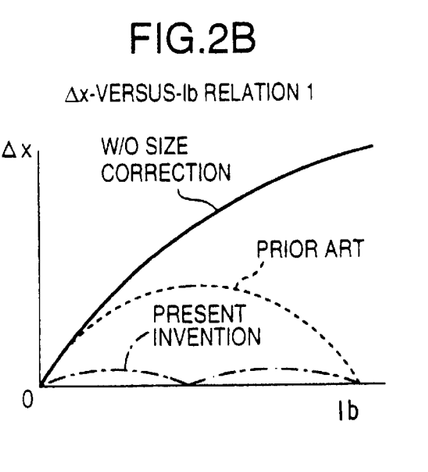

FIG. 2B is a view for graphically illustrating a relation between the beam current 1b and the horizontal size variation ΔX (i.e., variation of the window size in the horizontal direction). More specifically, in FIG. 2B, a solid-line curve represents the horizontal size variation ΔX taking place when no size correction is performed, a broken line curve represents the horizontal size variation ΔX occurring when the prior art size correction is performed, and a single-dotted broken-line curve represents the window size variation when the size correction according to the invention is performed.

As can be seen from FIG. 2B, when no window size correction is performed, the rate of change of the horizontal size variation ΔX is remarkably large for a given change of the beam current Ib when luminance is low (i.e., when the beam current Ib is small), as can be seen from the solid-line curve, whereas when luminance is high (i.e., when the beam current Ib is large), the rate of change of the horizontal size variation ΔX is small for the given change in the beam current 1b.

It will further be noted that when the conventional window size correction is adopted, the rate of change of the correcting quantity for the horizontal deflection size in dependence on change of luminance remains substantially constant. Accordingly, when the correcting quantity for the horizontal deflection size is so set that the horizontal size at a maximum luminance coincides with the horizontal size at a minimum luminance, as indicated by the broken-line curve in FIG. 2B, variation in the horizontal size becomes remarkable at intermediate luminance values.

By contrast, in the display apparatus according to the invention, the rate of change in the correcting quantity for the horizontal deflection size in dependence on change of luminance can be set properly for a low luminance range as well as for a high luminance region, respectively, to a great advantage. By way of example, the correcting quantity for the horizontal deflection size can be so controlled or adjusted that the horizontal deflection sizes at three luminance values, i.e., a maximum luminance value, an intermediate luminance value and a minimum luminance value coincide with one another, as is indicated by a single-dot broken line curve in FIG. 2B. Thus, the variation in the horizontal size can be significantly reduced when compared with the prior art deflection size correcting techniques.

Figure 2C:
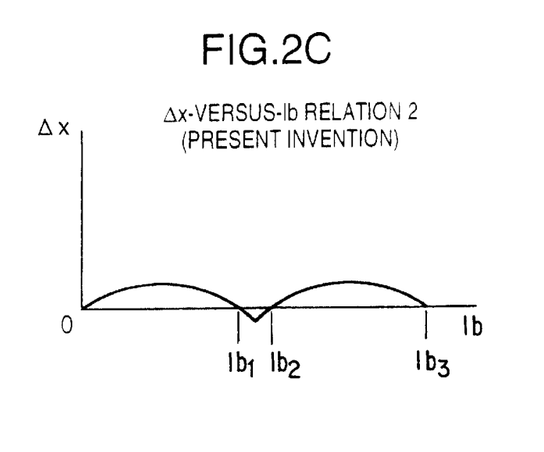

Additionally, by making use of a circuit arrangement similar to that of the first embodiment of the invention shown in FIG. 1, the method of correcting the horizontal size can be realized. FIG. 2C illustrates graphically a case where the rate of change of the correcting quantity for the horizontal deflection size is so controlled or adjusted that variation of the horizontal size disappears at two intermediate luminance values (at the beam current values Ib1 and Ib2, respectively). In this way, by adjusting or controlling the rate of change of the correcting quantity for the deflection size, variation of the deflection size brought about by the change of luminance can be made unobtrusive or unnoticeable.

Figure 2D:
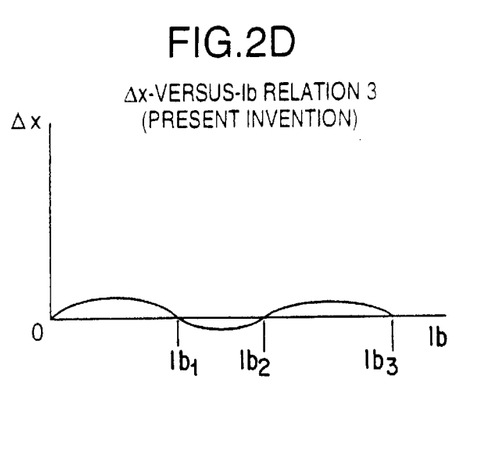

Furthermore, in the display apparatus according to the first embodiment of the invention shown in FIG. 1, by changing over smoothly the rate of change of the deflection size correcting quantity, the deflection size variation brought about by the luminance change can be rendered less remarkable. To this end, resistor(s) and capacitor(s) may be inserted in parallel with the Zener diode 34 of the deflection size control quantity change-over unit 27 shown in FIG. 1, to thereby realize the switching of the Zener diode 34 stepwise. In that case, the horizontal size variation ΔX bears such a relation to the beam current Ib as illustrated in FIG. 2D.

The foregoing description has been directed to the display apparatus in which the changing rate of the correcting quantity for the horizontal deflection size is changed over at two points corresponding to a low luminance value and a high luminance value, respectively. However, by changing over the rate of change of the correcting quantity for the horizontal deflection size at three points, i.e., at low, intermediate and high luminance values, respectively, matching of the horizontal size can be realized at four points, whereby the horizontal deflection size variation can further be suppressed. Needless to say, the variation of the horizontal size can further be reduced by increasing the number of times the rate of change of the correcting quantity for the horizontal deflection size is changed over or by changing continuously the rate of change of the correcting quantity for the horizontal deflection size.

Embodiment 2

Figure 3:
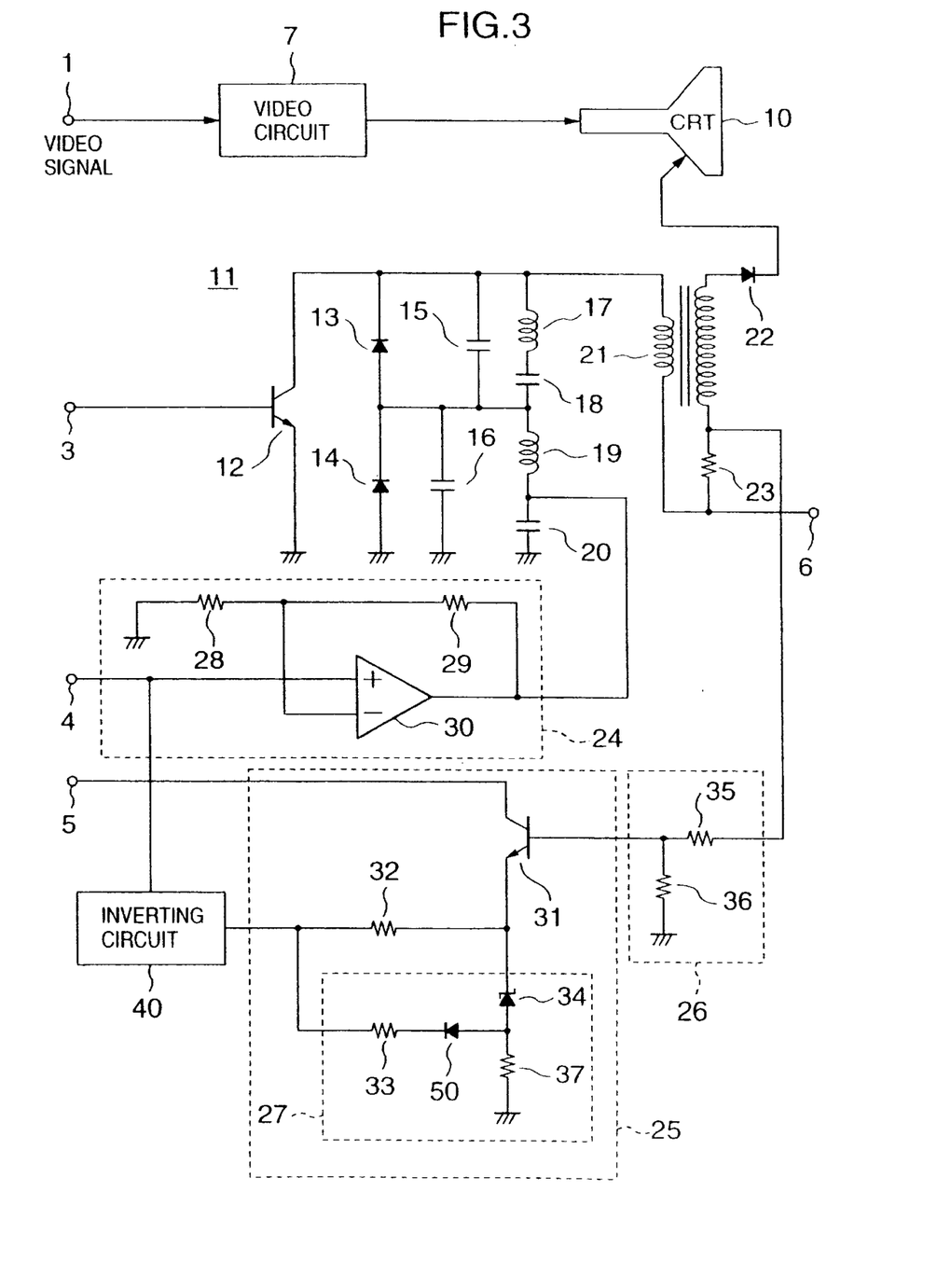
FIG. 3 is a circuit diagram showing a configuration of a display apparatus according to a second embodiment of the present invention.

Next, a display apparatus according to a second embodiment of the invention will be described by reference to FIG. 3. In this figure, a reference numeral 40 denotes an inverting circuit. The display apparatus according to the second embodiment differs from the first embodiment in that the deflection size control quantity adjusting voltage generated by the deflection size control quantity adjusting unit 25 is inverted by the inverting circuit 40 to be subsequently superposed onto the horizontal size control signal (inputted via the horizontal size control signal input terminal 4). Except for this difference, operations and the advantageous effects of the display apparatus according to the instant embodiment of the invention is substantially similar to those of the apparatus according to the first embodiment described hereinbefore by reference to FIG. 1.

Embodiment 3

Figure 4:
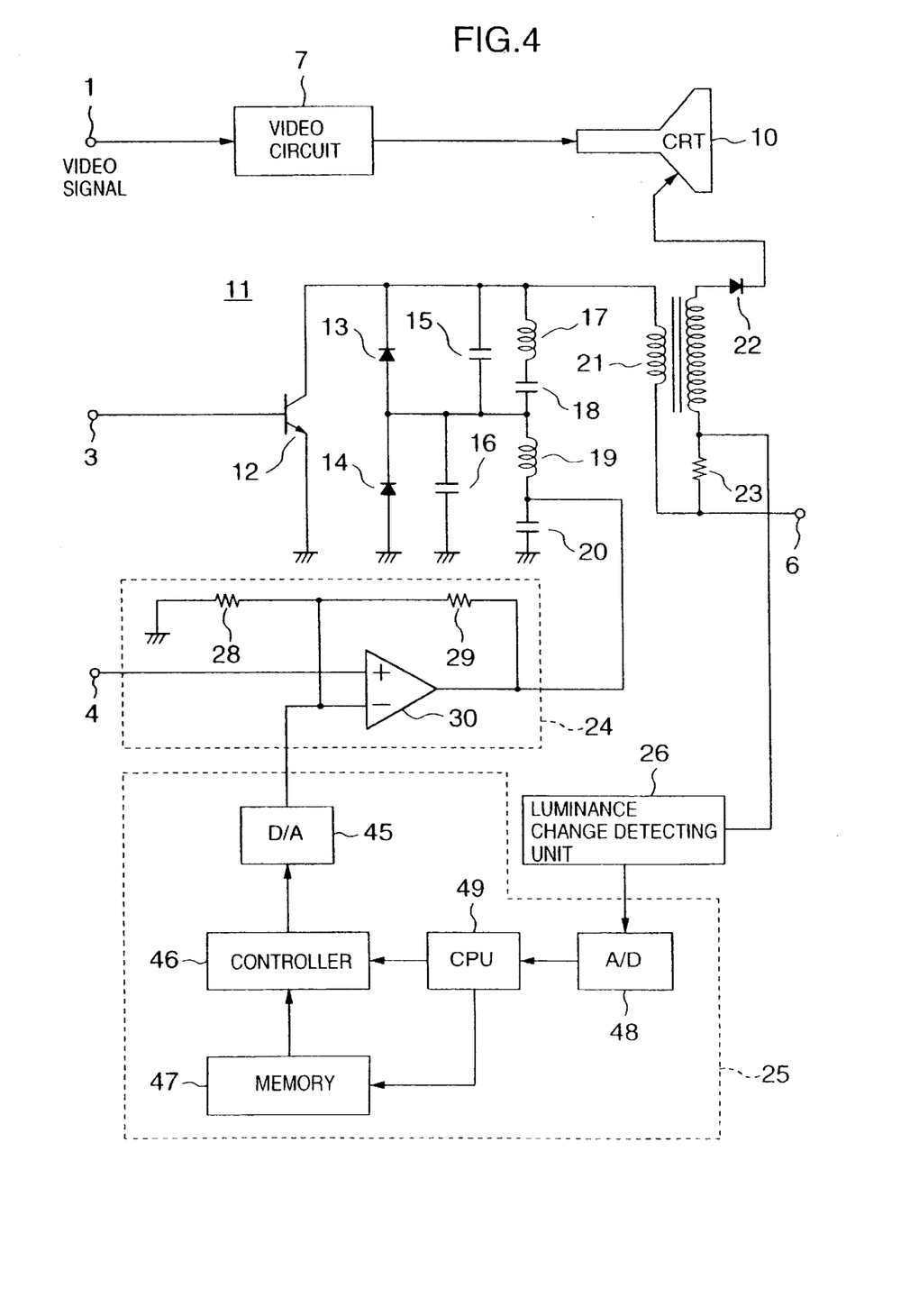
FIG. 4 is a circuit diagram showing a configuration of the display apparatus according to a third embodiment of the present invention.

Next, referring to FIG. 4, description will turn to a third embodiment of the present invention. In the figure, reference numeral 45 denotes a D/A converter (digital-to-analogue converter), 46 denotes a controller, 47 denotes a memory, 48 denotes an A/D converter (analogue-to-digital converter), and numeral 49 denotes a CPU (central processing unit). The deflection size control quantity adjusting unit 25 of the display apparatus according to the instant embodiment is constituted by the D/A converter 45, the controller 46, the A/D converter 48 and the CPU 49.

Now, operation of the display apparatus according to the third embodiment will be described. With the circuit arrangement shown in FIG. 14, a voltage varying in accompanying the change of luminance as detected by the luminance change detecting unit 26 is converted once into digital data by the A/D converter 48 and supplied to the CPU 49. Owing to the processings executed by the CPU 49, size correcting data stored previously in the memory 47 in correspondence to the change of luminance is supplied to the D/A converter 45 via the controller 46. The D/A converter 45 in turn generates a deflection size control quantity adjusting voltage on the basis of the size correcting data supplied from the controller 46. The deflection size control quantity adjusting voltage is then supplied to the horizontal size control circuit 24.

By virtue of the arrangement according to the third embodiment of the invention described above by reference to FIG. 4, the deflection size correcting quantity can be set optionally over a wide range of luminance values from minimum to maximum ones, which in turn means that the screen or window size (i.e., display area) can be maintained stably over a wide luminance range from lowest to highest luminance.

The display apparatuses described above in conjunction with the first to third embodiments of the invention are directed to the solution of the first object of the invention mentioned hereinbefore. In the following, the display apparatuses directed to the solution of the second object contemplated by the invention will be described.

Embodiment 4

Figure 5:
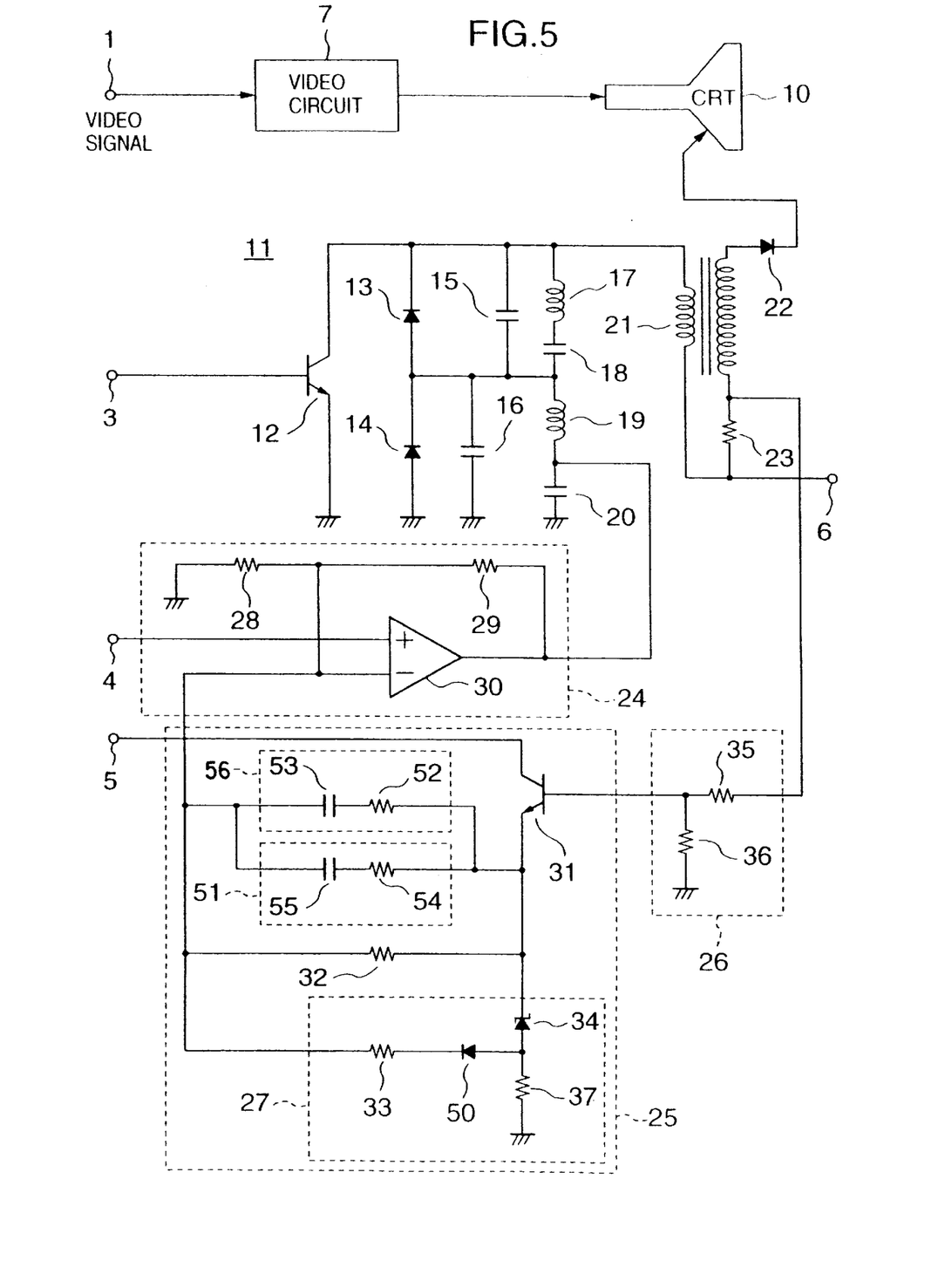
FIG. 5 is a circuit diagram showing a circuit configuration of the display apparatus according to a fourth embodiment of the invention.

FIG. 5 is a circuit diagram showing a circuit configuration of a display apparatus according to a fourth embodiment of the invention. The apparatus according to instant embodiment features that a low-frequency gain adjusting unit 56 constituted by a resistor 52 and a capacitor 53 and a high-frequency gain adjusting unit 51 constituted by a resistor 54 and a capacitor 55 are provided, differing from the apparatus according to the first embodiment of the invention.

Operation of the display apparatus according to the instant embodiment will now be described. The low-frequency gain adjusting unit 56 serves for detecting a low-frequency component of a voltage which is applied to the base of the transistor 31 and which varies as luminance changes, wherein the low-frequency component voltage is superposed on the deflection size control quantity adjusting voltage. On the other hand, the high-frequency gain adjusting unit 51 serves for detecting a high-frequency component of the voltage which is applied to the base of the transistor 31 and which varies in accompanying the change of luminance, wherein the high-frequency component voltage is superposed onto the deflection size control quantity adjusting voltage.

More specifically, capacitance of the capacitor 53 incorporated in the low-frequency gain adjusting unit 56 is selected greater than that of the capacitor 55 incorporated in the high-frequency gain adjusting unit 51 so as to present lower impedance to the low frequency component of the voltage varying in accompanying the change of luminance. The amplitude of the low frequency component superposed on the deflection size control quantity adjusting voltage is determined by the resistor 52.

On the other hand, capacitance of the capacitor 55 incorporated in the high-frequency gain adjusting unit 51 is selected smaller than that of the capacitor 53 incorporated in the low-frequency gain adjusting circuit 56 so as to present low impedance to the high frequency component of the voltage varying in accompanying the change of luminance. The amplitude of the high frequency component superposed on the deflection size control quantity adjusting voltage is determined by the resistor 54.

By providing the low-frequency gain adjusting unit 56 and the high-frequency gain adjusting unit 51 in the display apparatus according to the instant embodiment of the invention, as mentioned above, it is possible to determine optimally the low frequency component and the high frequency component of the voltage which varies in accompanying the change of luminance.

Parenthetically, it should be mentioned that in the display apparatus shown in FIG. 5, when the amplitude of the low frequency component voltage signal is adjusted by means of the resistor 52, the amplitude of the high frequency component voltage signal is caused to change correspondingly. However, by readjusting the high frequency component voltage signal with the aid of the resistor 54 incorporated in the high-frequency gain adjusting unit 51, the amplitude of the high frequency component voltage signal can be determined properly.

Figure 6A:
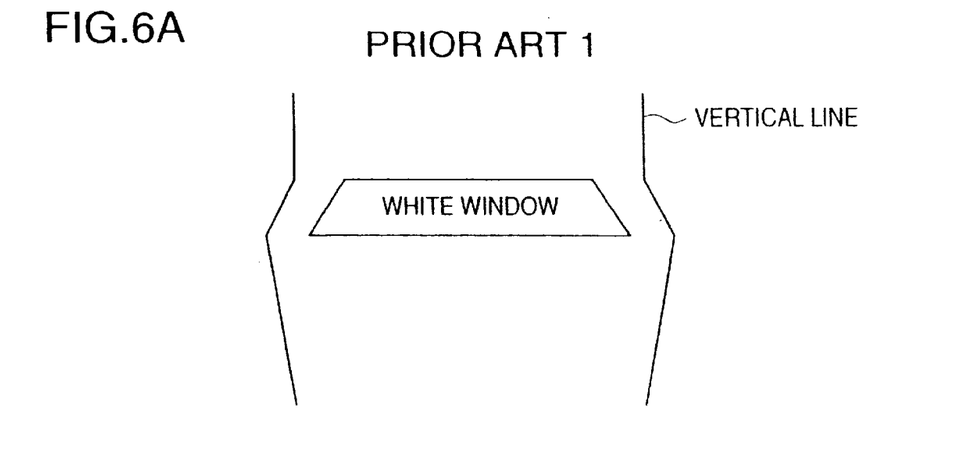
FIGS. 6A, 6B and 6C are views for illustrating operations of the display apparatus according to the fourth embodiment of the invention.
Figure 6B:
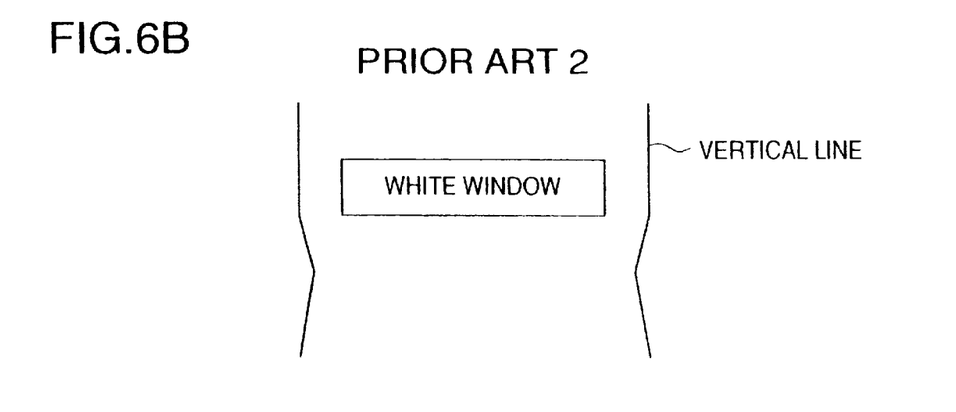
Figure 6C:
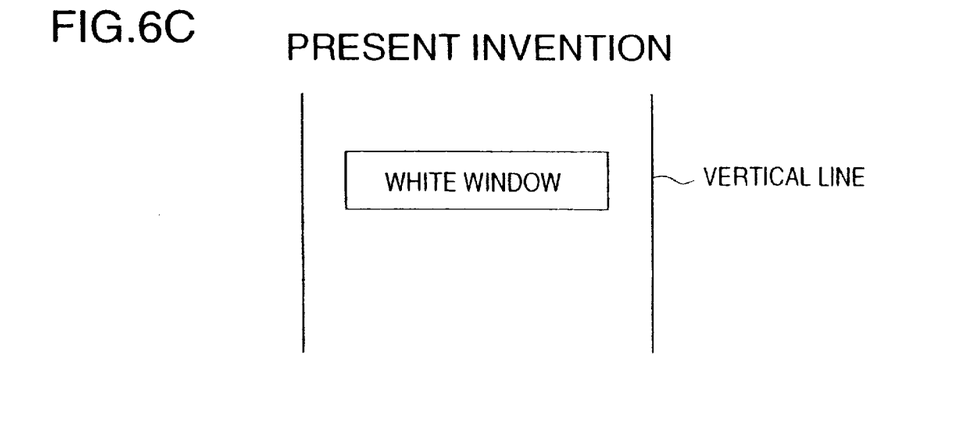

In this conjunction, it is to be noted that in the case of the conventional display apparatus, both the low frequency component and the high frequency component of the voltage which varies as luminance changes are simultaneously adjusted. Accordingly, when the amplitude of, for example, the high frequency component voltage signal is insufficient, meandering distortion will become remarkable during a white window displaying period. On the other hand, when the amplitude of the high frequency component signal is excessively large (i.e., when the amplitude of the low frequency component is insufficient, to say in another way), the meandering distortion during the white window display period can certainly be improved. However, the meandering distortion will then make appearance in an area located immediately beneath the white window. By way of example, FIG. 6A illustrates images displayed on the screen when the amplitude of the high frequency component signal is insufficient, and FIG. 6B illustrates corresponding images displayed on the screen when the amplitude of the high frequency component signal is excessively large (i.e., when the low frequency component is insufficient). Incidentally, in FIGS. 6A and 6B, it is assumed that a white window and vertical lines are simultaneously displayed on the screen of the cathode ray tube of the display apparatus.

According to the teaching of the invention incarnated in the fourth embodiment thereof, it is possible to set properly both the low frequency component and the high frequency component of the voltage which varies in accompanying the change of luminance, whereby images can be displayed optimally while avoiding the meandering distortion.

As is apparent from the foregoing, with the display apparatus according to the present invention which is comprised of the luminance change detecting unit for detecting variation of luminance of the cathode ray tube and the deflection size control quantity adjusting unit for stabilizing the deflection size by changing a deflection size correcting quantity at different rates of change for a low luminance range and a high luminance range on the basis of detected change of luminance, variation in the size of a display area which may otherwise take place in accompanying change of luminance can be suppressed to a significant extent when compared with the prior art. Thus, the first object of the present invention mentioned hereinbefore can be achieved.

Furthermore, with arrangement of the display apparatus according to the present invention that an optimal deflection size correcting quantity is obtained by synthesizing a high frequency component and a low frequency component of a signal indicative of luminance change with different gains, respectively, distortion of vertical lines displayed concurrently with a white window on a screen can be suppressed to a significant extent when compared with the prior art. Thus, the second object of the present invention mentioned previously can be achieved.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. A display apparatus having a horizontal deflection circuit for supplying a deflection current to a horizontal deflection coil and deflecting an electron beam emitted from an electron gun in a cathode ray tube, and being capable of underscanning to control a deflection size by said deflection current smaller than a size of a faceplate of said cathode ray tube, said display apparatus comprising:

a luminance detecting circuit which detects a luminance of said cathode ray tube;

a deflection size control quantity adjusting circuit coupled to said luminance detecting circuit, which produces an adjustment voltage for adjusting said deflection size in accordance with the detected luminance; and said adjustment voltage being varied in accordance with changing of luminance, at different rates as between a detected first luminance range and a detected second luminance range different from said first luminance range.

2. A display apparatus according to claim 1, wherein said luminance detecting circuit detects said luminance of said cathode ray tube on the basis of a beam current of said cathode ray tube.

3. A display apparatus according to claim 1, wherein the variation rate of said adjustment voltage is smaller in said second luminance range than in said first luminance range when said second luminance range is higher than said first luminance range.

4. A display apparatus having a horizontal deflection circuit for supplying a deflection current to a horizontal deflection coil and deflecting an electron beam emitted from an electron gun in a cathode ray tube, and being capable of underscanning to control a deflection size by said deflection current smaller than a size of a faceplate of said cathode ray tube, said display apparatus comprising:

a horizontal deflection size control circuit having an output terminal connected to an S-shaped capacitor correcting a deflection current flowing through said horizontal deflection coil for controlling a voltage across said S-shaped capacitor and controlling a horizontal deflection size by an output voltage of said output terminal;

a luminance detecting circuit connected to a secondary winding of a flyback transformer which generates a high voltage, for detecting a luminance of said cathode ray tube by detecting a beam current flowing through the flyback transformer; and a deflection size control quantity adjusting circuit having an input terminal connected to said luminance detecting circuit and an output terminal connected to said horizontal deflection size control circuit, which produces and supplies an adjustment voltage for adjusting an output voltage of said horizontal deflection size control circuit on the basis of the detected luminance to said horizontal deflection size control circuit;

wherein said adjustment voltage is varied in accordance with changing of luminance at different rates as between a detected first luminance range and a detected second luminance range different from said first luminance range.

5. A display apparatus according to claim 4, wherein the variation rate of said adjustment voltage is smaller in said second luminance range than in said first luminance range when said second luminance range is higher than said first luminance range.

6. A display apparatus having a horizontal deflection circuit for supplying a deflection current to a horizontal deflection coil and deflecting an electron beam emitted from an electron gun in a cathode ray tube, and being capable of underscanning to control a deflection size by said deflection current smaller than a size of faceplate of said cathode ray tube, said display apparatus comprising:

luminance detecting means for detecting a luminance of said cathode ray tube; and deflection size control quantity adjusting means for producing an adjustment voltage for adjusting said deflection size in accordance with the detected luminance;

wherein said adjustment voltage is varied in accordance with changing of luminance at different rates as between a detected first luminance range and a detected second luminance range different from said first luminance range.

7. A display apparatus according to claim 6, wherein said luminance detecting means detects said luminance of said cathode ray tube on the basis of a beam current of said cathode ray tube.

8. A display apparatus according to claim 6, wherein the variation rate of said adjustment voltage is smaller in said second luminance range than in said first luminance range when said second luminance range is higher than said first luminance range.

9. A display apparatus having a horizontal deflection circuit for supplying a deflection current to a horizontal deflection coil and deflecting an electron beam emitted from an electron gun in a cathode ray tube, and being capable of underscanning to control a deflection size by said deflection current smaller than a size of faceplate of said cathode ray tube, said display apparatus comprising:

a horizontal deflection size control means for correcting a deflection current flowing through said horizontal deflection coil for controlling a voltage across an S-shaped capacitor and controlling a horizontal deflection size by an output voltage of said horizontal deflection size control means;

a luminance detecting means for detecting a luminance of said cathode ray tube by detecting a beam current flowing through a secondary winding of a flyback transformer generating a high voltage on the basis of the deflection current;

deflection size control quantity adjusting means for producing and supplying an adjustment voltage for adjusting an output voltage of said horizontal deflection size control means on the basis of the detected luminance to said horizontal deflection size control means; and said adjustment voltage being varied in accordance with changing of luminance at different rates as between a detected first luminance range and a detected second luminance range different from said first luminance range.

10. A display apparatus according to claim 9, wherein the varying rate of said adjustment voltage is smaller in said second luminance range than in said first luminance range when said second luminance range is higher than said first luminance range.

* * * * *